March 26, 1935.  G. P. KITCHEN  1,995,988
SELECTIVE GEAR RATIO DRIVE MECHANISM FOR MOTOR VEHICLES
Filed Sept. 11, 1933   2 Sheets-Sheet 1
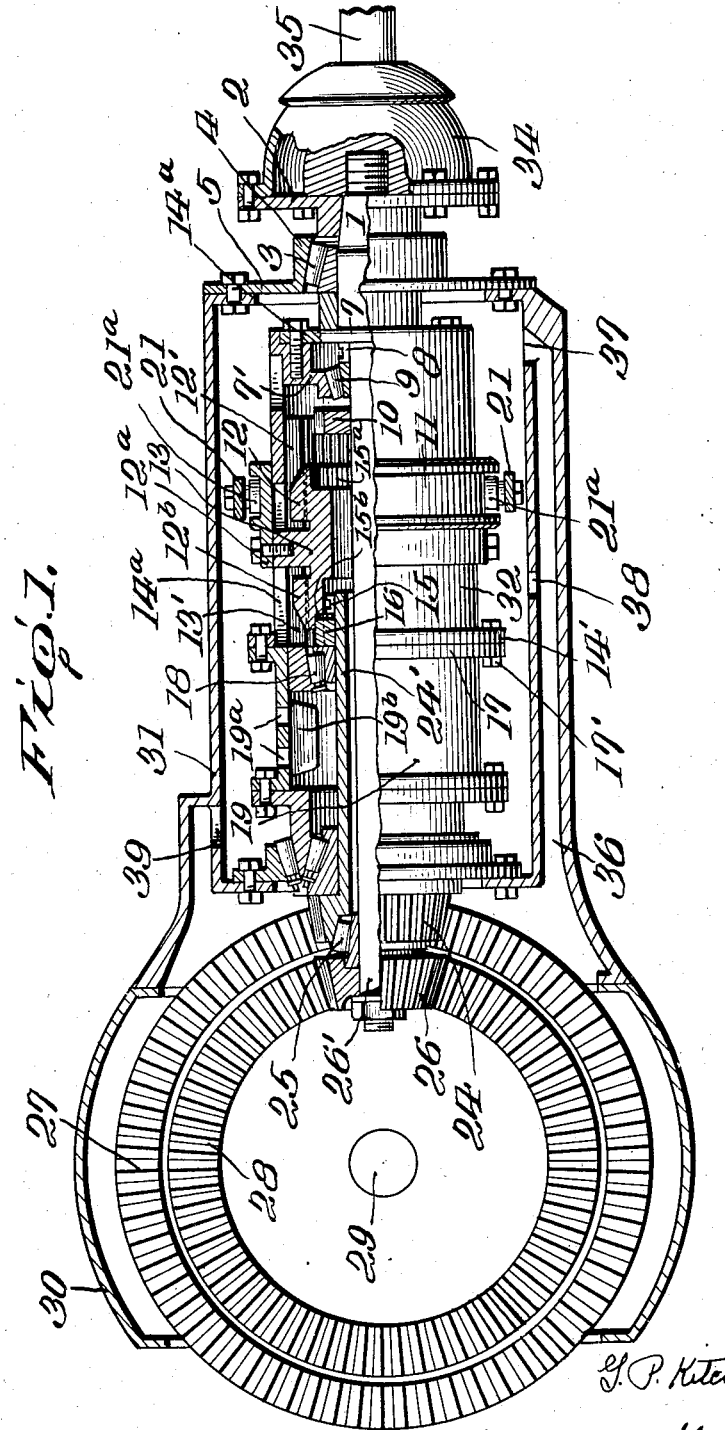
Inventor
G. P. Kitchen
By Patterson, Wright & Patterson
Attorneys

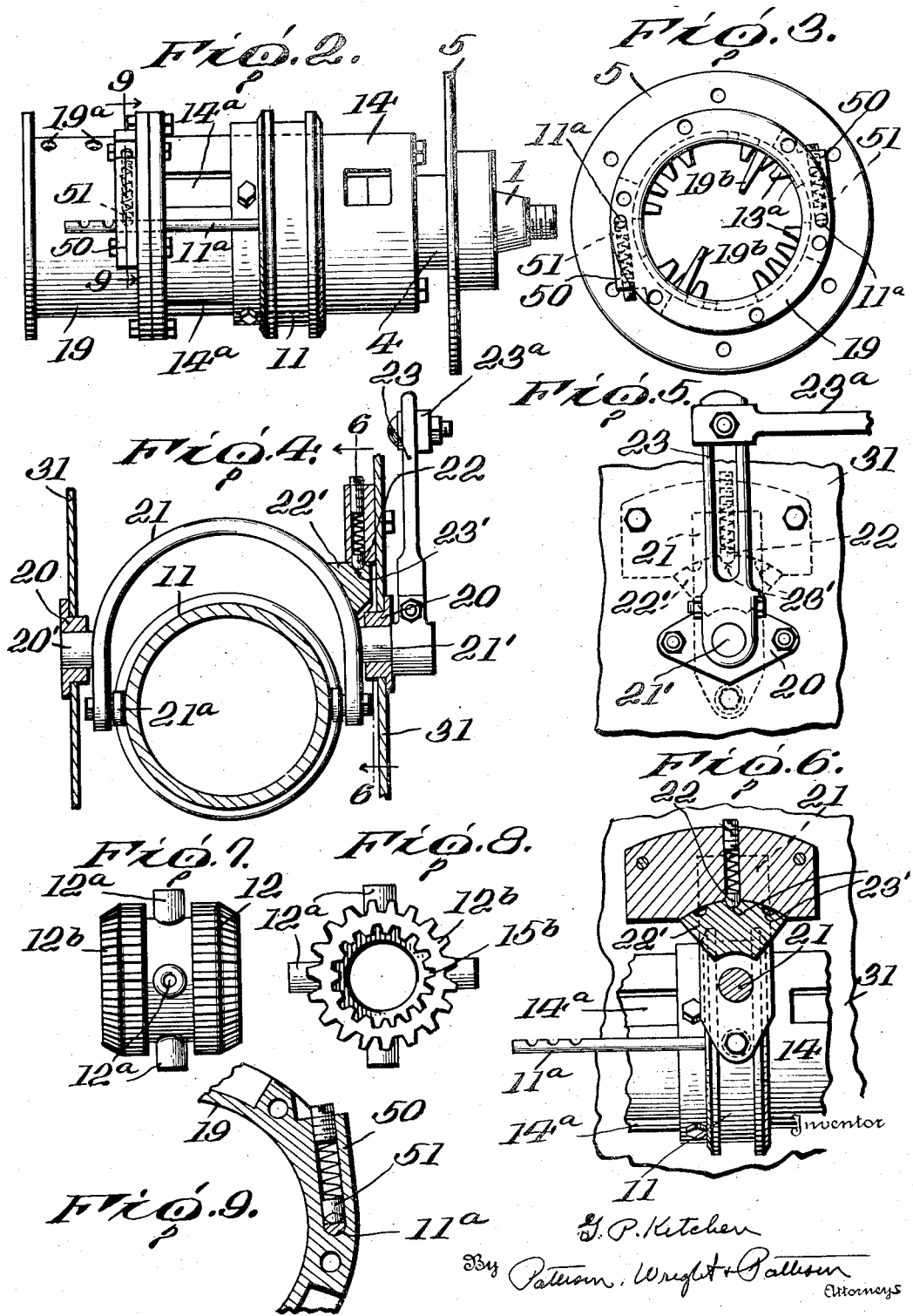

Patented Mar. 26, 1935

1,995,988

UNITED STATES PATENT OFFICE 1,995,988

SELECTIVE GEAR RATIO DRIVE MECHANISM FOR MOTOR VEHICLES

George P. Kitchen, Hays, Kans.

Application September 11, 1933, Serial No. 689,026

13 Claims. (Cl. 74—366)

The object of my invention is to provide a drive mechanism of this type adapted to be interposed between a transmission and differential gearing and supported within a forwardly extending housing supported by the differential housing whereby the same is lubricated by the grease of the differential housing.

Another object of my invention is to provide a drive mechanism devoid of the usual intermeshing gears whereby a direct drive can be obtained from the drive shaft to either of the pinion gears meshing with the ring gears.

Another object of my invention is to provide a drive mechanism in which the lock dog clutch can be readily shifted to lock either of the pinion gears to the drive mechanism which is connected directly to the drive shaft for changing the gear ratio.

Another object of the invention is to provide a drive mechanism for this type which has few moving parts and which is simple and effective in construction and having certain details of structure and combination of parts hereinafter more fully set forth.

In the accompanying drawings:

Figure 1 is a vertical sectional view of an automobile differential gearing showing my invention applied thereto.

Fig. 2 is a side elevation of the drive housing.

Fig. 3 is an end view of the left hand end of the housing appearing in Fig. 2.

Fig. 4 is a transverse sectional view illustrating the clutch operating mechanism.

Fig. 5 is a side view of the right-hand side of Fig. 4.

Fig. 6 is a vertical sectional view taken on the line 6—6, of Fig. 4.

Fig. 7 is a side view of the slidable clutch member.

Fig. 8 is an end view of Fig. 7.

Fig. 9 is a fragmentary vertical sectional view taken on the line 9—9 Fig. 2, looking in the direction indicated by arrow.

Referring now to the drawings, 29 represents the horizontal shaft of an automobile differential gearing which carries the two ring gears 27 and 28 arranged in the same plane but of different diameter. While I will describe this invention as applied to the differential gearing of an automobile, it will be understood that the same can be used in many places where it is desired to change the ratio of drive between the driven and drive shafts.

The usual differential housing 30 is provided with an additional forwardly extending housing 31 which encloses the housing 32 of my drive mechanism. The forward end of the housing 31 is closed by the plate 5 through which extends the stub shaft 1, and any packing can be used around the shaft to prevent the lubricating oil or grease from passing out of the casing 31. Secured to the outer end of the stub shaft is the universal connection 34 to which is connected the drive shaft 35 leading from the engine. The housing 31 is provided at its upper end with an oil passage 36, which has its forward end open at 37 to allow the lubricant to pass downwardly to the housing 32. The passage is also provided with openings 38 which allows some of the oil or grease to pass into the housing 32 intermediate its ends. The lower end of the housing 31 is provided with a passage 39 which allows the oil or grease to pass back into the differential housing 30.

The housing 32 is made in two sections, the forward section 14 being longer than the rear section 19 and the sections having abutting outwardly extending flanges 14' and 17 secured together by bolts 17' to form the rigid drive housing 32. The disk 2 of the stub shaft 1 forms a part of the universal connection 34 as clearly shown in Fig. 1 of the drawings. Carried by the stub shaft is a bearing 3 cooperating with bearing mountings 4 carried by the forward wall 5 of the housing 31. The inner end of the stub shaft 1 is provided with the outwardly extending flange 7 which is bolted to a flange 7' carried by the outer section 14 of the housing 32 by means of the bolts 14ª.

The differential has the two-ring gears 27 and 28 arranged in the same plane and one encircling the other and of different sizes as clearly shown in Fig. 1 of the drawings.

Meshing with the inner gear ring 28 is a pinion gear 26 carried by the floating shaft 26' which extends forward and terminates close to the inner end of the stub shaft 1. The section 14 of the housing 32 at its forward end is provided with a bearing 9 cooperating with the shaft 26' and held thereto by means of the lock nut 8. The shaft 26' is provided with a clutch element in the form of a gear 10 adapted to be locked to the housing 32 as will later be described. The ring gear 27 has meshing therewith a pinion gear 24 carried by the rear end of the floating hollow shaft 24' which surrounds the shaft 26' and extends into the housing about midway its length. The forward end of the floating hollow shaft 24' is provided with a clutch element 16 locked thereon by means of the lock nut 15. A bearing 25 is provided at the rear end of the hollow floating shaft and cooperating with the solid floating shaft 26¹, whereby they are free to rotate one on the other. A bearing 18 is provided at the forward end of the section 19 of the housing 32 which cooperates with the hollow shaft 24' in beyond the clutch element 16.

The outer section 14 of the housing 32 is provided with two spaced internal toothed clutch elements 12' and 13' forming a portion of the lock dog clutch. Within the housing 32 intermediate the internal clutch elements 12' and 13' is the movable portion 13 of the lock dog clutch and which is provided at each end with clutch elements in the form of gears 12 and 12ᵇ which are adapted to mesh with the internal clutch elements 12' and 13', as will be later described.

The member 13 at each end is provided with internal clutch elements in the form of gears 15ᵃ and 15ᵇ adapted to mesh with the clutch elements 10 and 16 carried by the shafts 24' and 26', whereby either shaft can be locked to the housing 32 and driven thereby. This movable member 13 of the lock dog clutch is of a length less than the distance between the clutch elements 10 and 16, and it can consequently be moved into a neutral or non-drive position where neither of its internal clutch elements 15ᵃ and 15ᵇ mesh with the clutch elements 10 or 16.

The dog clutch member 13 at the center is provided with four outwardly extending arms 12ᵃ which extend through the elongated longitudinally extending openings 14ᵃ in the section 14 of the housing 32, whereby the clutch member is free to move longitudinally within the housing but held against rotation. Carried by the outer ends of the arms 12ᵃ and surrounding the section 14 of the housing is a clutch collar 11 operated through the medium of a lever, as will be later described. In order to hold the collar in its adjusted position it is provided with two arms 11ᵃ arranged on opposite sides and extending parallel with the housing 32. The said arms 11ᵃ are provided with notches and pass through brackets 50 provided with spring pressed plungers 51 cooperating with the notches in the arms.

The housing 31 is provided on opposite sides with openings covered by plates 20 in which are mounted the trunnions 20' and 21' carried by the yoke 21 which surrounds the upper half of the housing 32. The lower ends of the yoke are provided with pins carrying rollers 21ᵃ entering the groove of the clutch collar 11 and whereby the same is moved longitudinally on the housing 32. The trunnion 21' is provided with an arm 23, which extends upwardly and has connected thereto a rod 23ᵃ which extends forward and is operated from the driver's seat. In order to further hold the clutch collar in its adjusted position the yoke 21 is provided with a segmental plate 22' having notches 23' in its upper face and into which is pressed the spring pressed plunger 22 carried by the inner face of the housing 31. As shown in Fig. 6 there are three notches 23' to hold the clutch collar in its three different positions.

The section 19 of the housing 32 is provided with a series of openings 19ᵃ by means of which the grease or oil can pass within the housing 32 from the gear casing 31 to thoroughly lubricate the working parts therein. In order to prevent the oil from being thrown out of the housing 32 too rapidly, guard plates 19ᵇ are arranged on the inside opposite the openings.

When the parts are in the position shown in Fig. 1 of the drawings, the gear ratio has been increased. It will be seen from this figure the clutch dog member 13 is moved rearwardly so that the teeth 12ᵇ on its rear outer periphery is in mesh with the internal toothed clutch element 13' of the housing 32 and therefore locked thereto. The internal toothed clutch element 15ᵃ of the clutch dog member meshes with the clutch element 16 carried by the outer end of the sleeve shaft 24 which carries the pinion gear 24 meshing with the larger ring gear 27. By moving the operating rod forward the yoke 21 is swung on its trunnions moving the clutch dog member 13 forward so that the internal gear 15ᵇ is out of mesh with the clutch element 16 carried by the hollow shaft and thus the housing 32 is rotating but is not driving the differential. A further forward movement of rod 23ᵃ moves the member 13 so that its internal clutch element 15ᵃ is in mesh with the clutch element 10 carried by the shaft 26'. This shaft carries the pinion gear 26 which meshes with the smaller ring gear 28 and the ratio of drive is decreased and increasing the power.

While I have shown the device as applied to an automobile differential, it will be understood that the same could be applied to any drive mechanism where at times it is desired to increase or decrease gear ratio.

Having thus described my invention, what I claim and desire to secure by Letters Patent is:

1. In a changeable gear ratio drive, the combination of a drive shaft having two beveled gears of different sizes, two concentric shafts, a pinion gear carried by each shaft and meshing with the beveled gears, a housing surrounding the entire length of the concentric shafts, a driven shaft rotating said housing, and a lock dog clutch member movable in said housing and having driving connection therewith and adapted to lock one of the concentric shafts to the housing by movement in one direction and the other shaft by movement in the opposite direction.

2. In a changeable gear ratio drive, the combination of a drive shaft having two ring gears of different sizes mounted thereon, a shaft having a pinion gear meshing with the smaller ring gear and a clutch member at its outer end, a hollow shaft surrounding the last mentioned shaft and having a pinion gear meshing with the larger ring gear, and of a length less than the inner shaft and having a clutch member at its outer end, a housing surrounding both of the clutch members of the two shafts and the shafts throughout their lengths, a driven shaft rotating said housing, and a lock dog clutch member within the housing and adapted to interlock with the clutch members of the shaft carrying the pinion gears.

3. In a changeable gear ratio drive, the combination of a drive shaft having two ring gears of different sizes, two concentric shafts one within the other, pinion gears carried by the shafts and meshing with the ring gears, spaced clutch members carried by the outer ends of the concentric shafts, a housing surrounding the entire length of the concentric shafts and both clutch members, a drive shaft rotating said housing, and a slidable lock dog clutch member within the housing and adapted to cooperate with the clutch members carried by the concentric shafts for locking either shaft to the housing.

4. In a changeable gear ratio drive, the combination of a drive shaft having two ring gears of different sizes, a pinion gear carried by a shaft and meshing with one of the ring gears, a clutch element carried by the outer end of said shaft, a hollow shaft surrounding the last mentioned shaft and having a pinion gear meshing with the other ring gear, said last mentioned outer shaft being shorter than the first mentioned inner shaft, a clutch element carried by the outer end of the hollow outer shaft, a housing surrounding the clutch elements and extending throughout the length of and surrounding the aforementioned concentrically arranged pinion gear carrying shafts, a driven shaft rotating said housings, a lock dog clutch member slidably carried within said housing and surrounding said concentrically arranged shafts and provided in its ends with internal clutch elements adapted to embrace and mesh with the clutch elements of the concentric pinion gear shafts, a collar surrounding the housing and slidable thereon, and said collar supporting and forming an operative means for the lock dog clutch member.

5. The combination with a changeable gear ratio drive comprising a drive shaft having two ring gears of different sizes and two concentric and independent pinion shafts carrying pinion gears meshing with the ring gears and provided with clutch elements, of a driven shaft arranged in spaced parallel alignment with said pinion gear shafts, a drive housing provided internally with the clutch elements in spaced relation, one end of said drive housing closed by a plate carried by said driven shaft and rotatable therewith, the opposite end of the rotatable drive housing rotatably supported upon the outer of said concentric pinion shafts, a clutch slidable within the drive housing and adapted for selective driving engagement with the clutch elements of said housing, and said clutch also adapted for selective driving engagement with the clutch elements of either of said pinion shafts.

6. The combination with a drive shaft having two ring gears of different sizes and two concentric and independent pinion shafts of different lengths provided at one end with pinion gears meshing with the ring gears and adjacent their other ends with clutch elements, of a drive housing surrounding said pinion shafts and having an end plate closure forming a driving connection between the housing and a driven shaft, a pair of clutch elements carried by the inner face of said housing in separated parallel relation, a ring clutch within the housing and surrounding the pinion shafts, said clutch having in the inner faces of its ends internal clutch elements, external clutch elements on said clutch ring at its ends, said clutch ring being of a width less than the distance between the clutch elements carried by the pinion shafts and of a width less than the distance separating the internal clutch elements of the drive housing, and means external of the housing and having operative connection with the clutch ring for selectively moving said clutch so that the clutch elements at one end of the clutch will provide an operative drive connection between the drive housing and one of the pinion shaft gears.

7. A structure such as defined in claim 6, wherein the means external of the housing for operating the clutch is in the form of a collar encircling the housing and provided with a plurality of arms extending parallel with the housing, said arms being provided with indentures, and a bracket slidably receiving said arms and provided with detents adapted to resiliently engage the clutch arm indentures for locking the clutch in its selected position.

8. The combination with a housing provided with a drive shaft carrying a pair of ring gears of different sizes and a pair of concentrically arranged pinion shafts provided with pinion gears meshing with said ring gears and said shafts extending outwardly from the housing, of a driven shaft having driving connection with an elongated housing surrounding said pinion shafts, a clutch within said housing and movable for selectively providing driving connection between the housing and either of said shafts, a third housing supported upon the housing enclosing the ring gears and extending outwardly therefrom and enclosing said drive housing, said third housing provided with a bearing for said driven shaft, and the end of the drive housing adjacent the ring gears being rotatably supported between bearings carried by the outer pinion shaft and the third housing.

9. A structure such as defined in claim 8, wherein the drive housing is provided with a bearing for rotatably supporting the outer end of the inner pinion shaft.

10. A structure such as defined in claim 8, wherein the drive housing is provided with bearings for rotatably supporting the outer ends of both pinion shafts.

11. In a structure such as defined in claim 8 wherein the drive housing is provided with openings for the passage of oil and the third housing is provided with an elongated passageway forming an oil conduit between the housing enclosing the ring gears and the outer end of the third housing.

12. An improved drive, comprising a drive shaft and a driven shaft arranged in separated relationship, a pair of gears of different sizes carried by and having driving connection with the drive shaft, two concentric shafts each of which carries a pinion gear meshing with one of the gears of the drive shaft, said concentrically arranged shafts extending towards but stopping short of the driven shaft, a housing completely surrounding and rotatably supporting said concentric shafts, said housing having driving connection with the driven shaft whereby the housing rotates with said shaft, and a clutch member having driving connection with said housing positioned and movable in said rotatable housing and adapted to selectively lock either one of the concentric shafts to the housing to provide a selective driving connection between the driven shaft and either of the gears carried by the drive shaft.

13. In a changeable gear ratio drive, the combination of a drive shaft having two ring gears of different sizes, two concentric shafts one within the other, pinion gears carried by the shafts and meshing with the ring gears, spaced clutch members carried adjacent the outer ends of the concentric shafts, a housing surrounding the entire length of the concentric shafts and both clutch members, a drive shaft rotating said housing, a slidable collar surrounding the housing and supporting a lock dog clutch member within the housing, clutch members carried by the housing and adapted to be selectively engaged by the said lock dog clutch member, said lock dog clutch member adapted to selectively engage either of the clutch members carried by the concentric shafts for locking either of said shafts to the housing, a lever having operative connection with said collar for sliding the same and the lock dog clutch member within the housing, means to lock said lever in any of a plurality of adjusted positions, said collar provided with a plurality of arms extending parallel to the outer wall of the housing, said arms sliding through means carrying resiliently operated detents engaging said clutch collar arms for further locking the clutch and its collar in any of a plurality of selected positions.

GEORGE P. KITCHEN.